UNITED STATES PATENT OFFICE.

JOHN H. FITZGERALD, OF FRANKFORD, WEST VIRGINIA.

PLASTERING COMPOSITION.

SPECIFICATION forming part of Letters Patent No. 391,890, dated October 30, 1888.

Application filed May 8, 1888. Serial No. 273,249. (No specimens.)

*To all whom it may concern:*

Be it known that I, JOHN H. FITZGERALD, a citizen of the United States, residing at Frankford, in the county of Greenbrier and State of West Virginia, have invented certain new and useful Improvements in Plastering Compositions, of which the following is a specification.

My invention consists of an improved plastering composition which presents the advantages of being unaffected, after standing for twelve or twenty-four hours, by cold or heat, and of rendering buildings plastered with it more impervious to the variations of heat, cold, and moisture, of possessing a greater quantity of what is known among plasterers as "fat" or "slobber," and hence of being worked with greater ease and being put on more rapidly and cheaply, of having but two coats which can be worked in immediate succession, the first, which I have described in another application, giving a smooth surface without "floating," and the second or skin coat, which is the subject of this application, being one with which joinings and facings can be made without leaving dark lines or markings or presenting the appearance of patching. Through it tack-stains and nail-heads will not show. The first coat need not be more than one-half the usual thickness, and can be troweled down for painting, calcimining, or papering, thus saving the second or skin coat, unless a fine white-finish is desired, which the second coat will give, and which can be put on, if need be, without waiting for the first coat to dry, and which will not rub off or crack, as some other compounds will do.

This compound can be put on and will adhere with tenacity to both smooth wooden surfaces, iron, or glass. Openings may be cut through it without breaking it, and the necessity of patching be thus avoided, and it sets with sufficient rapidity to enable the carpenter to follow almost immediately after the plasterer. When mixed in the proportions given, it can be kept in any climate, and is ready for use by simply mixing with cold water.

My present invention relates to the composition for the second coat. The compound for this is composed of the following materials, and are mixed in the following proportions: three grains of cream of tartar, one hundred and twenty grains of pumice-stone, thirty grains of granulated sugar, one-fourth of a pound of slaked lime, and one-half of a pound of plaster-of-paris. From four to five barrels of the composition described in the other application, and from one to one and one-half barrel of this will suffice for one hundred square yards of lathed wall.

The function of the ingredients of this finishing-coat is as follows: The cream of tartar is to lighten the skin coat, make it work more easily and rapidly under the trowel, to lay the suction and retard the setting. The pumice-stone is to strengthen and harden the body. Sugar is used to give a gloss, retard the setting, and give greater tenacity and adhesion. The lime is to give body and whiteness, and the plaster-of-paris is to secure quick setting, hardness, smoothness, and whiteness.

What I claim as new, and for which I desire to secure Letters Patent, is—

A plastering composition consisting of cream of tartar, pumice-stone, sugar, lime, and plaster-of-paris, in or about the proportions described.

JOHN H. FITZGERALD.

Witnesses:
 JOHN W. HARRIS,
 E. C. BEST.